United States Patent [19]

Magol et al.

[11] Patent Number: 4,746,337

[45] Date of Patent: May 24, 1988

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

[21] Appl. No.: 69,930

[22] Filed: Jul. 6, 1987

[51] Int. Cl.[4] ............................................ B01D 51/00

[52] U.S. Cl. ........................................ 55/269; 55/435; 122/6 A

[58] Field of Search ....................... 122/6 A; 110/245; 55/267-269, 435

[56] References Cited

U.S. PATENT DOCUMENTS

| | | | |
|---|---|---|---|
| 2,937,141 | 5/1960 | Helwig | 208/361 |
| 3,470,678 | 10/1969 | Clark | 55/269 |
| 3,732,920 | 5/1973 | Kimmel | 165/119 |
| 4,615,715 | 10/1986 | Seshamani | 55/269 |

FOREIGN PATENT DOCUMENTS

| | | | |
|---|---|---|---|
| 567450 | 2/1945 | United Kingdom | 55/269 |
| 709182 | 1/1980 | U.S.S.R. | 55/269 |

*Primary Examiner*—Bernard Nozick

*Attorney, Agent, or Firm*—Marvin A. Naigur; Warren B. Kice

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent radially inwardly towards the inner pipe to support the inner cylinder and water is passed through the tubes to cool the outer cylinder.

7 Claims, 1 Drawing Sheet

CYCLONE SEPARATOR HAVING WATER-STEAM COOLED WALLS

BACKGROUND OF THE INVENTION

This invention relates to a cyclone separator and, more particularly, to such a separator for separating solid fuel particles from gases discharged from a combustion system or the like.

Conventional cyclone separators are normally provided with a monolithic external refractory wall which is abrasion resistant and insulative so that the outer casing runs relatively cool. Typically, these walls are formed by an insulative refractory material sandwiched between an inner hard refractory material and an outer metal casing. In order to achieve proper insulation, these layers must be relatively thick which adds to the bulk, weight, and cost of the separator. Also, the outside metal casing of these designs cannot be further insulated from the outside since to do so could raise its temperature as high as 1500° F. which is far in excess of the maximum temperature it can tolerate.

Further, most conventional cyclone separators require relatively expensive, high temperature, refractory-lined ductwork and expansion joints between the reactor and the cyclone, and between the cyclone and the heat recovery section, which are fairly sophisticated and expensive. Still further, conventional separators formed in the above manner require a relatively long time to heat up before going online to eliminate premature cracking of the refractory walls, which is inconvenient and adds to the cost of the process. Also these type of conventional cyclone separators require a separate roof tube circuit which further adds to the cost of the system.

SUMMARY OF THE INVENTION

It is therefore an objective of the present invention to provide a cyclone separator in which heat losses are reduced and the requirement for internal refractory insulation is minimized.

It is a still further object of the present invention to provide a cyclone separator of the above type in which the bulk, weight and cost of the separator are much less than that of conventional separators.

It is a still further object of the present invention to provide a cyclone separator of the above type in which the need for expensive high temperature refractor-lined ductwork and expansion joints between the furnace and the cyclone separator and between the latter and the heat recovery section are eliminated.

It is a still further object of the present invention to provide a cyclone separator of the above type which can be put into use relatively quickly without any significant warm-up period.

It is a still further object of the present invention to provide a cyclone separator of the above type in which the temperature of the outer walls of the separator can be maintained the same as the temperature of the walls of the adjoining reactor.

It is a still further object of the present invention to provide a cyclone separator of the above type in which the need for a separate roof type circuit is eliminated.

Toward the fulfillment of these and other objects the separator of the present invention includes an outer cylinder and an inner pipe disposed in a coaxial, spaced relationship to define an annular chamber for receiving gases having solid particles entrained therein. The outer cylinder comprises a plurality of tubes extending vertically in a parallel relationship for at least a portion of their lengths with a portion of the tubes being bent from the plane of the outer cylinder to form an inlet opening in a tangential relationship to the annular chamber for receiving the gases containing the solid particles. The mixture of gases and solid particles are directed through the annular chamber for separating the solid particles from the gases by centrifugal forces, whereby the solid particles fall to the lower portion of the outer cylinder for disposal and the gases pass upwardly through the inner pipe to external equipment. The tubes forming the outer cylinder are bent radially inwardly towards the inner pipe to support the pipe, and water is passed through the tubes to cool the outer cylinder.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
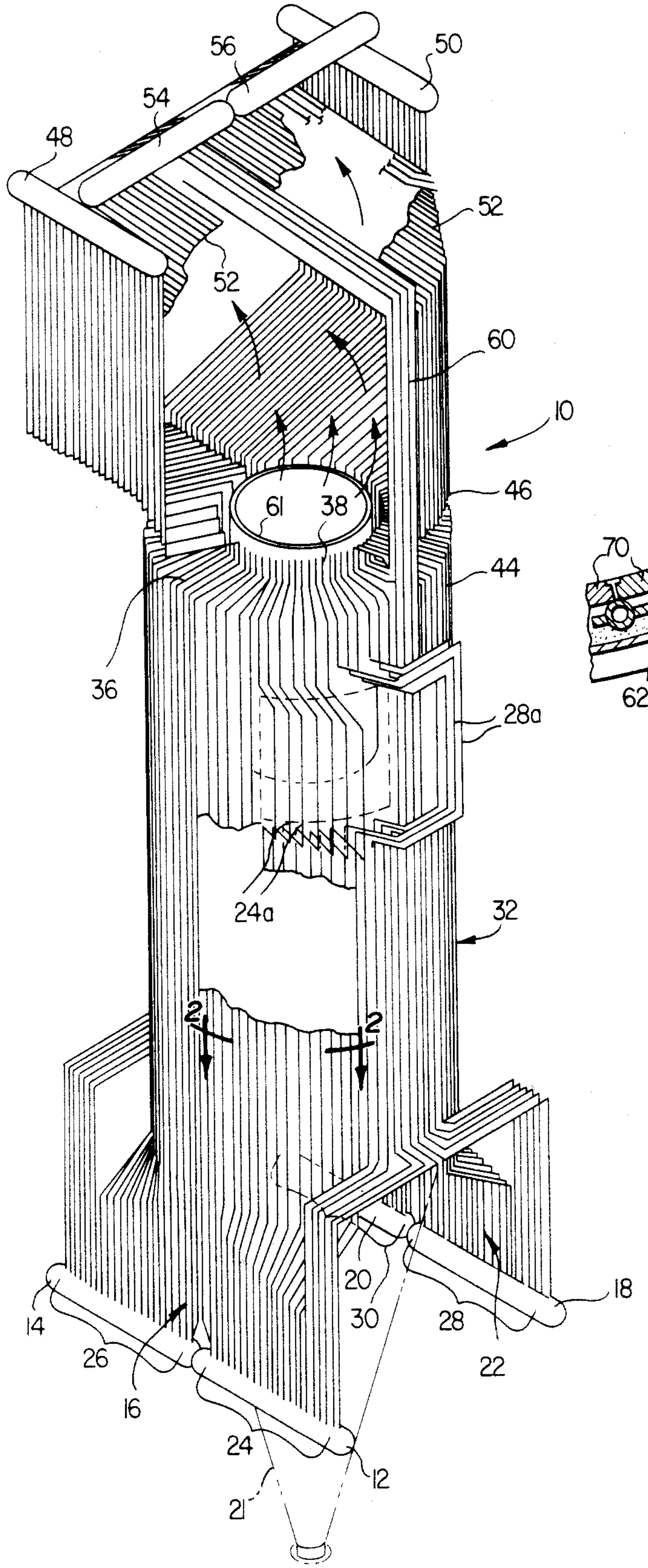
FIG. 1 is a perspective/schematic view of the cyclone separator of the present invention showing only the tubes forming the outer cylinder.

Referring to FIG. 1 of the drawings, the reference numeral 10 refers in general to the cyclone separator of the present invention which includes a front header 12 and a rear header 14 forming the lower end portion of a side wall 16 of the separator. A front header 18 and a rear header 20 form the lower end portion of the other side wall 22 of the separator. The headers 12, 14, 18 and 20 extend to either side of a hopper 21 disposed at the lower portion of the separator for reasons to be described.

A group of vertically extending spaced parallel tubes 24 are connected at their lower ends to the header 12 and form the front portion of the wall 16, and another group of vertically extending spaced parallel tubes 26 are connected to the header 14 and form the rear portion of the wall 16. In a similar manner, a group of vertically extending spaced parallel tubes 28 are connected to the header 18 and form the front portion of the wall 22, and another group of vertically extending spaced parallel tubes 30 extend from the header 20 and form the rear portion of the wall 22.

The groups of tubes 24, 26, 28, and 30 extend vertically upwardly for a relatively small length and then are bent inwardly and angularly so that they together form a closed right cylinder shown in general by the reference numeral 32, with the tubes 24 and 28 together forming the front half of the cylinder 32 and the tubes 26 and 30 together forming the rear half of the cylinder 32.

A portion of the tubes 24 and 28 are bent out of the plane of the cylinder 32 as shown by the reference numeral 24_a_ and 28_a_ to form an inlet passage to the interior of the cylinder for reasons that will be described.

At the upper end of the cylinder 32, the tubes 24, 26, 28, and 30 are bent radially inwardly, as shown by the reference numeral 36, and then upwardly, as shown by the reference numeral 38, to define a circular opening which, of course, is of a diameter less than that of the diameter of the cylinder 32. The tubes 24, 26, 28 and 30 are then bent radially outwardly as shown by the reference numeral 44 and then vertically upwardly as shown by the reference numeral 46. The upper end portions of the tube group 26 thus form a sidewall which is connected to an upper header 48 and the upper end portions of the tube group 30 form a sidewall which is connected to an upper header 50. The upper end portions of the tubes 24 and 28 are bent horizontally to extend across the upper end portion of the cylinder 32 to form a roof 52 and are connected at their free ends to upper headers 54 and 56, respectively. A portion of the upper portions of the tubes 24 and 26 have been deleted for the convenience of presentation.

It is understood that a portion of the tubes 24, 26, 28 and 30 do not bend in the manner discussed above but rather extend vertically for the entire length of the cylinder 32 for the purpose of enabling the separator to be supported from the roof of a building or structure in which the separator 10 is located. These latter tubes are shown by the reference numeral 60 and extend from the header 18 in the manner discussed above, then straight up for the length of the cylinder 32 before bending horizontally to form a portion of the roof 52. Although not shown in the drawings, it is understood that a plurality of lugs, or the like, are connected to the tubes 60 and are adapted to be connected to hangers, or the like (not shown), which extend from the roof of the building to support the separator 10 without the need for steel supports at the bottom of the cylinders. It is also understood that the tubes 60 can be spaced out over the entire diameter of the cylinder 32 as needed.

An inner pipe, or barrel 61 is disposed within the cylinder 32 and is formed from a solid, metallic material such as stainless steel, and has an upper end portion extending approximately flush with the opening formed by the vertical bent tube portions 38. The pipe 61 extends from the latter opening to an area coincidental with the inlet formed by the bent tube groups 24*a* and 28*a*. Thus an annular passage is formed between the outer surface of the pipe 61 and the inner surface of the cylinder 32, for reasons that will be described.

Figure 2:
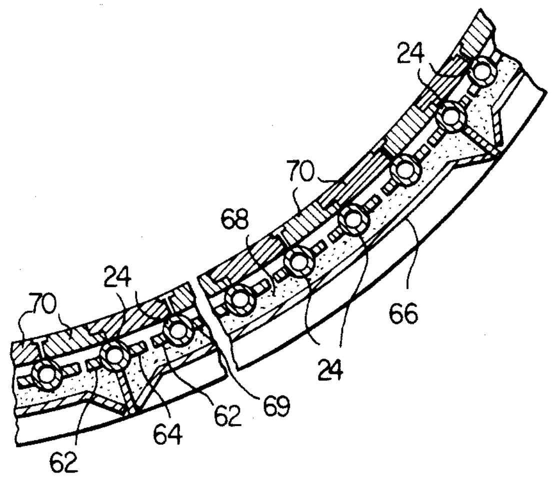
FIG. 2 is a cross-sectional view taken along the portion of the wall of the outer cylinder of FIG. 1 designated by the line 2—2, and showing the insulative materials surrounding the tubes.

The tubes 24, 26, 28 and 30 are disposed between an insulative material and an erosion preventing structure which are omitted from FIG. 1 for the convenience of presentation but which are shown in FIG. 2. More particularly, the details of a wall portion of the cylinder 32 formed by the group of tubes 24 are shown in FIG. 2. More particularly, each tube 24 has a pair of fins 62 and 64 extending from diametrically opposed portions of its wall, with a slight spacing being provided between the fin 62 of one tube and the fin 64 of an adjacent tube. A seal plate 66 is provided in a slightly spaced relationship to the plane of the tubes 24 and a heat insulative refractory material 68 is disposed between the outer surface of the tubes and the inner wall of the seal plate. A plurality of tiles 70 extend adjacent the inner wall of the tubes 24 and are interlocked to protect the tubes from erosion.

In operation, and assuming the separator 10 of the present invention is part of a boiler system including a fluidized bed reactor, or the like, disposed adjacent the separator, the inlet formed by the bent tubes 24*a* and 28*a* receives hot gases from the reactor which gases contain entrained fine solid particulate fuel material from the fluidized bed. The gases containing the particulate material thus swirl around the annular chamber defined between the cylinder 32 and the inner pipe 61 and the solid particles are propelled by centrifugal forces against the inner wall of the cylinder 32 where they collect and fall downwardly by gravity into the hopper in a conventional manner.

The relatively clean gases in the annular chamber are prevented from flowing upwardly by the roof 52 and thus pass into and through the inner pipe 61 before exiting in a direction shown by the arrows in FIG. 1 through an outlet defined by the sidewalls connected to the headers 48 and 50. It is understood that a plurality of screen tubes (not shown) can be provided in the path of the gases exiting in this manner and the gases can then pass to a heat recovery area disposed adjacent the separator 10.

Water from an external source is passed into the headers 12, 14, 18 and 20 and thus passes upwardly through the groups of tubes 24, 26, 28 and 30 before exiting, via the headers 48, 50, 54 and 56, to external circuitry which may form a portion of the boiler system including the separator 10.

Several advantages result from the foregoing arrangement. For example, the cyclone separator of the present invention reduces heat losses and minimizes the requirement for internal refractory insulation. Also, the bulk, weight, and cost of the separator of the present invention is much less than that of conventional separators. The separator of the present invention also eliminates the need for expensive high temperature refractory-lined ductwork and expansion joints between the reactor and cyclone separator, and between the latter and the heat recovery section.

Further, the cyclone separator of the present invention can be put into use relatively quickly without any warm-up period, and the temperature of the outer walls of the separator can be maintained the same as the temperature of the walls of the adjoining reactor.

Still further, by utilizing the upper end portions of the tube groups 24 and 28 to form a roof, the requirement for additional roof circuitry is eliminated.

It is understood that several variations may be made in the foregoing without departing from the scope of the invention. For example, the fins 62 and 64 extending from each tube can be welded together to form a gas tight structure or, alternatively, can be eliminated and the tubes welded directly together.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A cyclone separator comprising an inner cylinder; an outer cylinder extending around said inner cylinder in a coaxial relationship to define an annular chamber between the two cylinders, said outer cylinder comprising a plurality of tubes extending vertically and circumferentially in a parallel relationship for at least a portion of their lengths, a portion of said tubes being bent from the plane of said outer cylinder to form an inlet opening in a tangential relationship to said outer cylinder for receiving gases containing solid particles and directing same through said annular chamber for separating the solid particles from said gases by centrifugal forces, the separated gases exiting through said inner cylinder and the separated solids falling to the bottom of said outer cylinder for disposal, said tubes being bent radially inwardly towards said inner cylinder to support said inner cylinder; and means for passing water-steam through said tubes to cool said outer cylinder.

2. The separator of claim 1 wherein upper portions of said tubes are bent across the upper end of said outer cylinder to form a roof.

3. The separator of claim 1 wherein upper and lower end portions of said tubes are configured to form two opposite side walls of an enclosure and the intermediate portion of said tubes are bent into said cylindrical configuration.

4. The separator of claim 1 further comprising a plurality of support tubes connected to said outer cylinder for supporting said separator from a building.

5. The separator of claim 1 wherein said tubes are disposed in a spaced relationship.

6. The separator of claim 5 wherein each tube has a continuous fin extending from diametrically opposite portions thereof for the length of said tube.

7. The separator of claim 5 further comprising refractory means extending around the inner and outer surfaces of said outer cylinder.

* * * * *

US004746337B1

REEXAMINATION CERTIFICATE (1769th)

United States Patent [19]

Magol et al.

[11] B1 4,746,337

[45] Certificate Issued Aug. 11, 1992

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

Reexamination Request:
No. 90/002,426, Sep. 3, 1991

Reexamination Certificate for:

| | |
|---|---|
| Patent No.: | 4,746,337 |
| Issued: | May 24, 1988 |
| Appl. No.: | 69,930 |
| Filed: | Jul. 6, 1987 |

[51] Int. Cl.[5] .................... B01D 51/00
[52] U.S. Cl. .................... 55/269; 55/435; 122/6 A
[58] Field of Search .................... 55/268, 269, 435; 122/6 A

[56] References Cited

U.S. PATENT DOCUMENTS

| | | | |
|---|---|---|---|
| 1,890,170 | 12/1932 | Van Brunt | 55/269 |
| 2,437,294 | 3/1948 | Dalin | 55/269 |
| 2,937,141 | 5/1960 | Helwig | 208/361 |
| 3,327,456 | 6/1967 | Guber, Jr. et al. | 55/269 |
| 3,470,678 | 10/1969 | Clark et al. | 55/269 |
| 3,732,920 | 5/1973 | Kimmel | 165/119 |
| 4,615,715 | 10/1986 | Seshamani | 55/269 |
| 4,913,711 | 4/1990 | Stewart | 55/269 |

FOREIGN PATENT DOCUMENTS

| | | | |
|---|---|---|---|
| 2527478 | 12/1983 | France . | |
| 54-91602 | 7/1979 | Japan . | |
| 57-35857 | 2/1982 | Japan . | |
| 437124 | 2/1985 | Sweden . | |
| 709182 | 1/1980 | U.S.S.R. | 55/269 |
| 567450 | 2/1945 | United Kingdom | 55/269 |
| 587240 | 4/1947 | United Kingdom . | |
| 641357 | 8/1950 | United Kingdom . | |

*Primary Examiner*—Bernard Nozick

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent radially inwardly towards the inner pipe to support the inner cylinder and water is passed through the tubes to cool the outer cylinder.

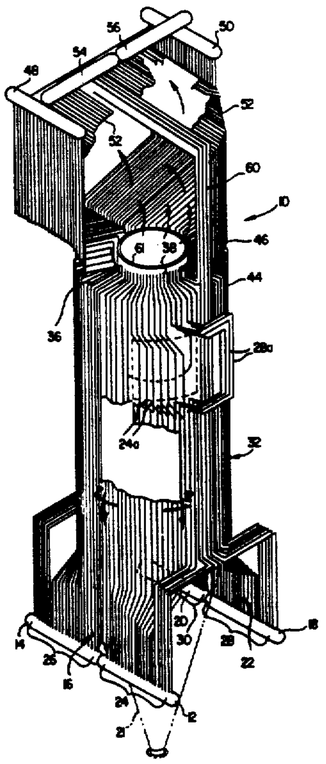

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION IT HAS BEEN DETERMINED THAT:

Claims 1 and 2 are cancelled.

Claims 3-6 are determined to be patentable as amended.

Claim 7 dependent on an amended claim, is determined to be patantable.

New claims 8-11 are added and determined to be patentable.

3. The separator of claim 1 wherein upper and lower end portions of said tubes are configured to form two opposite *planar* side walls of *end portions of* an enclosure and the intermediate portion of said tubes are bent into said cylindrical configuration *to form an intermediate portion of said enclosure.*

4. The separator of claim [1] *3 wherein a portion of said tubes extend vertically for the entire length of said outer cylinder for the purpose of enabling said separator to be supported* [further comprising a plurality of support tubes connected to said outer cylinder for supporting said separator] from *above* [a building].

5. The separator of claim [1] *3* wherein said tubes are disposed in a spaced relationship.

6. The separator of claim *1 or* 5 wherein each tube has a continuous fin extending from diametrically opposite portions thereof for the length of said tube.

*8. The separator of claim 6 wherein said tubes and said fins of adjacent tubes are disposed in a spaced relationship.*

*9. The separator of claim 8 further comprising a plurality of seal plates extending around said outer cylinder in a coaxial relationship to form a gas-tight structure.*

*10. The separator of claim 3 further comprising a hopper section disposed below said inner and outer cylinders, and wherein said lower planar side walls extend adjacent diametrically opposed portions of said hopper.*

*11. The separator of claim 3 further comprising means for supporting said separator for a roof of a structure.*

* * * * *